AUTOMATIC INPUT POWER LEVEL ADJUSTMENT APPARATUS
FOR AMPLIFIER OF A BROADBAND REPEATER

Filed Feb. 9, 1965 2 Sheets-Sheet 1

INVENTOR
P. T. HUTCHISON
BY C. E. Hirsch Jr.
ATTORNEY

United States Patent Office 3,411,088

Patented Nov. 12, 1968

3,411,088

AUTOMATIC INPUT POWER LEVEL ADJUSTMENT APPARATUS FOR AMPLIFIER OF A BROADBAND REPEATER

Paul T. Hutchison, New Providence, N.J., assignor to Bell Telephone Laboratories, Incorporated, New York, N.Y., a corporation of New York Filed Feb. 9, 1965, Ser. No. 431,312
9 Claims. (Cl. 325—3)

ABSTRACT OF THE DISCLOSURE

Broadband repeaters used in random access systems must accommodate a plurality of randomly present signals. Consequential vacillation in power level at the input of the repeater amplifier results in saturation of the amplifier. Non-saturated operation is accomplished by the automatic adjustment of the power input level to the amplifier, in accordance with the number of received intelligence signals present at the input of the amplifier.

Figure 1:
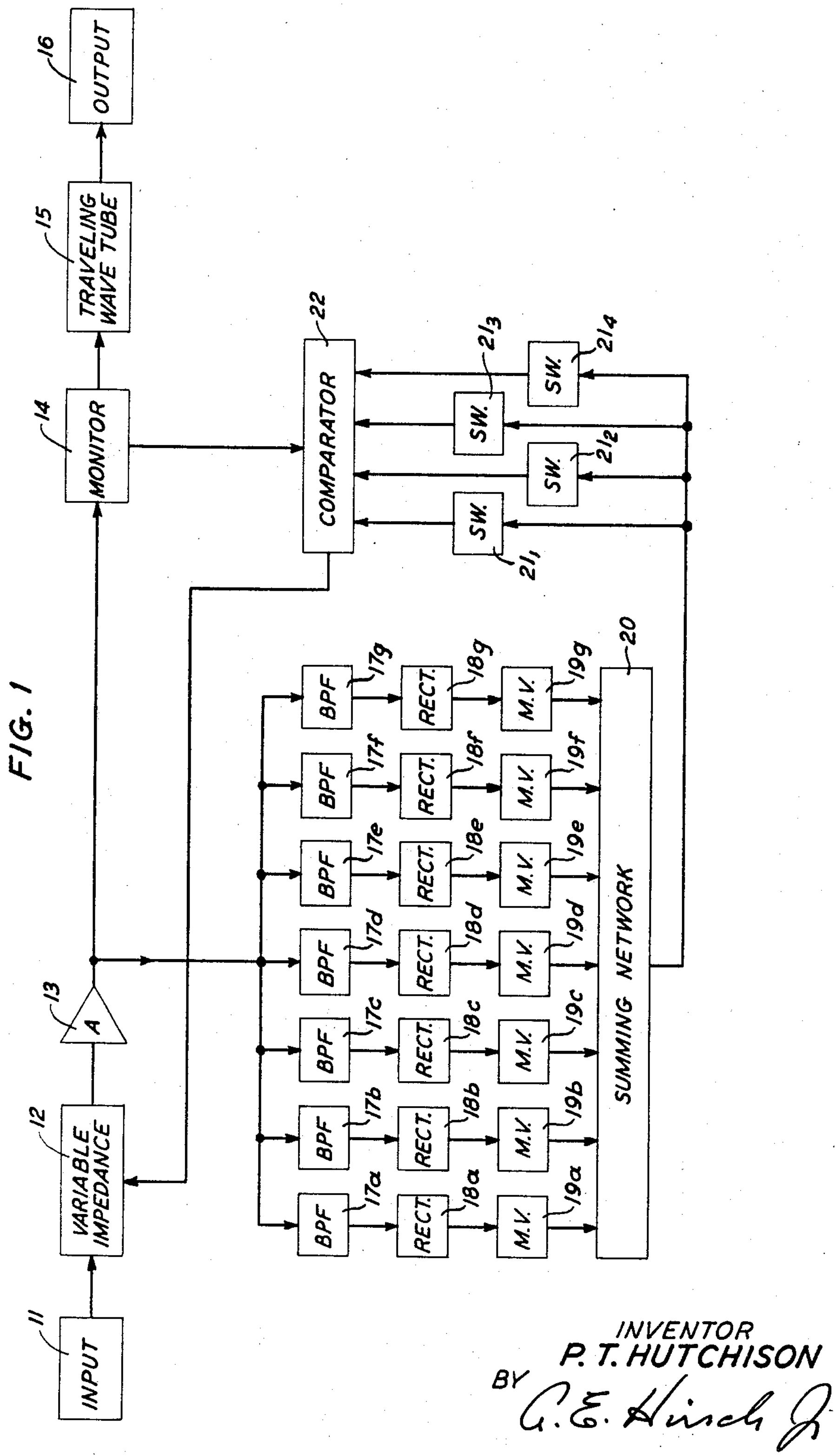

This invention pertains to radio relay systems and, more particularly, to communication repeater systems utilizing broadband amplifiers.

Broadband repeaters are widely used in communication systems to amplify and relay signals transmitted between terminal stations. For example, in satellite communication systems, a single orbital repeater, or a small number of such repeaters, is used to relay propagated signals over distances much greater than typical transmission distances on the surface of the earth. The versatility of such repeaters is greatly increased if they can accommodate a plurality of signals simultaneously.

Traveling-wave tube amplifiers are ideally suited for such application because of their characteristic broadband capability. It is well known, however, that fluctuations in the input signal power level to the amplifier may cause variations in gain. In random access systems, where a plurality of signals must be accommodated, but where individual signals may or may not be present, variation in total signal power input to the amplifier is an inevitable result. As the number of signals applied to the amplifier varies, the power input to the amplifier likewise vacillates. Because of the random addition and subtraction of the diverse signals present at the input of the amplifier, the phenomenon known as saturation frequently occurs. Operation of the amplifier in the saturated region results in random phase modulation and intermodulation of the intelligence signals. In communication systems, nonsaturated operation is thus essential.

The object of this invention is to insure nonsaturated operation of a repeater capable of accommodating a plurality of intelligence signals.

This and other objects are accomplished in the present invention by the automatic adjustment of the power drive to a broadband repeater amplifier in accordance with the number of intelligence signals received. A control signal of a magnitude proportional to the total number of signals detected in a plurality of transmission channels is utilized to adjust the power input to an optimum operating level for a variety of signal conditions.

More particularly, a plurality of filter networks, having contiguous bandpass characteristics corresponding, respectively, to preassigned signal transmission bands or channels, are used to sense or detect the presence of a signal in each channel. The rectified output of each filter network energizes a corresponding trigger circuit. Signals developed by the trigger circuits, representative of the number of intelligence signals present, are additively combined in a summing network. The magnitude of the output of the summing network is determinative of the reference signal used in a comparator circuit. This reference signal, dependent on the magnitude of the summing network output, and that dependent on signal input conditions, corresponds to a predetermined optimum operating level. A monitoring voltage proportional to the power of the total signal appearing at the amplifier input is compared with the selected reference signal. Resultant difference or error signals, developed by the comparator circuit, control the power input to the amplifier by means of a variable impedance. Optimum operation of the broadband amplifier in its nonsaturated region is thereby insured for a variety of signal input conditions.

These and further features and objects of this invention, its nature and various advantages will appear more fully upon consideration of the attached drawings and the following detailed description of the drawings.

Figure 2:
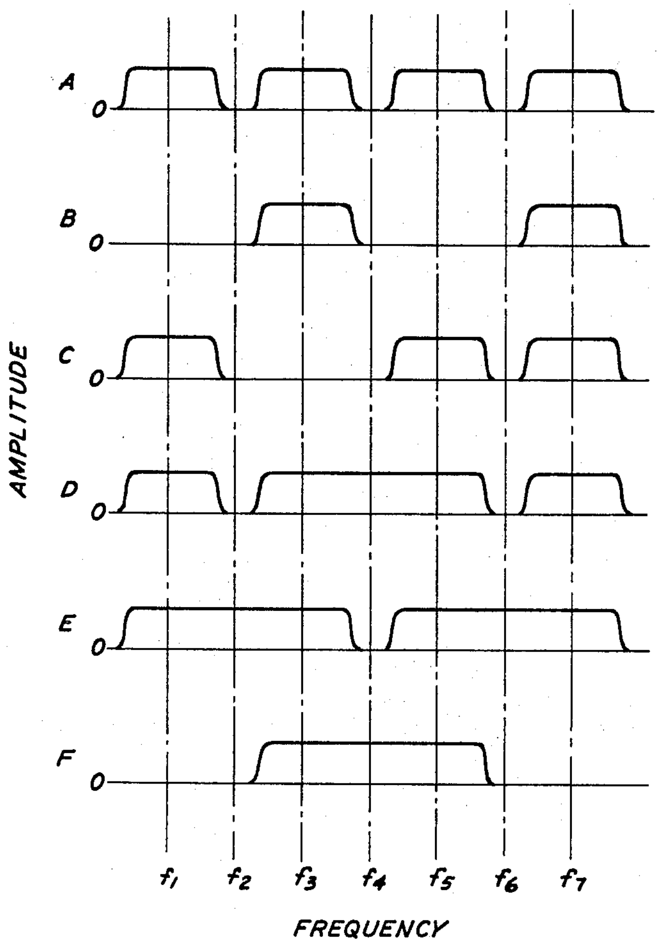

In the drawings:

FIG. 1 is a block diagram of a broadband radio repeater which employs the features of the present invention; and FIG. 2 is illustrative of the variety of signal conditions which the repeater of the present invention may accommodate.

In FIG. 1, input 11 may include an antenna for receiving one or more signals simultaneously, or another source of information-bearing electromagnetic waves. Input 11 may also include some initial stages of amplification and frequency translation. Output 16 may comprise a transmitting antenna or other means for utilizing an information-bearing electromagnetic wave.

Signals received from any of a number of diverse sources are applied via input 11 to a variable impedance 12. Impedance 12 may be, for example, a variolosser of the type described in the article entitled, "The Spacecraft Communications Repeater," authored by C. G. Davis, P. T. Hutchison, F. J. Witt and H. I. Maunsell in the Bell System Technical Journal, vol. 42, part 2, 1963 at page 831. The attenuated signals developed by impedance 12 are increased in amplitude by amplifier 13 and applied to monitor 14. Monitor 14 transmits these signals to traveling-wave tube amplifier 15 and also develops a DC voltage proportional to the total signal power present at the input of tube 15. A suitable monitor, which may be used in the present invention, is described on page 846 of the above-mentioned article. Amplifier 15 may, for example, be of the type described in "The Satellite Traveling-Wave Tube," authored by M. G. Bodmer, J. P. Laico, E. G. Olsen, and A. T. Ross at page 1703 of the aforementioned volume of the Bell System Technical Journal. Amplifier 15 might also be any other amplifying device with a frequency response of sufficient width to accommodate a plurality of communication signals. After amplification by tube 15 the intelligence signals are applied to output 16 and thence propagated to a number of diverse receivers or utilized as desired.

As discussed above, optimum operation of a traveling-wave-tube amplifier is a function of total input power. Variation in input power is an inevitable occurrence when signal conditions at the repeater change unpredictably. A few of the variety of signal conditions which may exist at the input of amplifier 15, prior to selective adjustment of the power level in accordance with this invention, are depicted in FIG. 2. The spectra of the various signals are shown constant in amplitude; it is assumed that the signals are frequency modulated. It is to be understood, however, that the principles of this invention also find use in amplitude or other modulation systems. Illustratively, seven bands or channels are shown centered about the frequencies $f_1$, $f_2$ . . . $f_7$. A fewer or greater number of bands may, of course, be used. Condition A illustrates the case where four signals are present at the input of the repeater. Each signal occupies somewhat less than a fourth of the total bandwidth. Guard bands centered about frequencies $f_2$, $f_4$ and $f_6$ aid in signal separation. Conditions B and C depict the possible location of two and three signals, respectively. In condition D one of the signals centered at $f_4$ occupies about twice the bandwidth of either of the two other signals. This signal channel might, of course, also be centered at $f_2$ or $f_6$. Two signals, each occupying somewhat less than one-half the total bandwidth are depicted as condition E. If there is only one signal present, e.g., a single television program shown as condition F, the center frequency might be at $f_2$, $f_6$ or $f_4$ as shown.

Selective adjustment of the power level to the repeater amplifier is therefore required if the repeater is to function effectively in a communication system subject to the random variations in signal power illustrated in FIG. 2.

Returning now to the description of FIG. 1, an alternate signal path is provided at the output of amplifier 13. Connected thereto, in a parallel arrangement, is a bank of conventional bandpass filter networks, $\mathbf{17_a} \ldots \mathbf{17_g}$, proportioned as required for the diverse signals to be accommodated by the repeater. Conventional diode peak rectifiers 18, responsive to those signals passed by networks 17 activate trigger circuits 19. Circuits 19 may be conventional monostable multivibrators. Each trigger circuit develops a constant output signal if there is an input signal greater than a predetermined magnitude in the band covered by the associated filter network. The output signals of the energized trigger circuits associated with filter networks $\mathbf{17_b}$, $\mathbf{17_d}$, and $\mathbf{17_f}$, i.e., those associated with the guard bands, are, for reasons discussed hereafter, designed to be opposite in polarity to the output signals of the remaining trigger circuits. Output signals from trigger circuits 19 are additively combined in summing network 20. The resultant signal, equal in magnitude to the algebraic sum of the trigger outputs, corresponds to the number of signals present at the input of amplifier 15.

Alternate ones of the networks, namely, $\mathbf{17_a}$, $\mathbf{17_c}$, $\mathbf{17_e}$ and $\mathbf{17_g}$ have, respectively, bandpass center frequencies at $f_1$, $f_3$, $f_5$ and $f_7$, and have bandwidths corresponding to the signal channels depicted as condition A of FIG. 2. Thus, for condition A, four signals are present and the output of summing network 20 is, for example, "plus four" amplitude units. For conditions B and C, signals of a magnitude "plus two" and "plus three" units, respectively are developed. The wider-band signal of condition D energizes networks $\mathbf{17_c}$, $\mathbf{17_d}$, and $\mathbf{17_e}$. However, the trigger circuit associated with guard band filter network $\mathbf{17_d}$ develops a signal of opposite polarity to signals developed by the associated trigger circuits of networks $\mathbf{17_c}$ and $\mathbf{17_e}$. The net signal amplitude developed in summing network 20 by this unitary signal is, properly, "plus one" unit. The total summed output of network 20 for condition D is therefore "plus three" units. For other signal combinations, the guard band filters, $\mathbf{17_b}$, $\mathbf{17_d}$ and $\mathbf{17_f}$, also develop opposite polarity signals to assure correct summing. Similarly, an examination of conditions E and F will show that signals of "plus two" units and "plus one" unit are respectively developed.

Thus, the magnitude of the signal output of network 20 corresponds to the number of signals present at the input of amplifier 15. Accordingly, switches 21, e.g., four single-stage transistor amplifiers, are activated by this output signal. The number of switches that operate is dependent on the magnitude of the summed signal. Thus, for condition A, a signal of "plus four" units activates all four switches while for condition F only one switch is energized. These switches control the reference voltage used in comparator 22. The four different reference voltages which may be obtained, by the practice of this invention, correspond to optimum operating levels empirically determined for the variety of signal conditions. A discussion of how optimum operating levels may be determined is given on page 1734 of the aforementioned volume.

Comparator 22, e.g., a difference amplifier develops a voltage proportional to the difference in magnitude of the monitor output and reference voltage. This difference, or error signal, varies the loss characteristic of variable impedance 12 to reduce or increase the power of input to amplifier 15. Quiescent operation occurs when the monitor output signal and the appropriate reference voltage are identical. Thus, by the practice of this invention, one of four reference voltages, determined by the number of input signals present, is used as a comparison voltage to automatically adjust the power input to an optimum level.

It is to be understood that the embodiment shown and described is illustrative of the principles of the invention only, and that further modifications of this invention may be made by those skilled in the art without departing from the scope and spirit of the invention. For example, the number of signal channels and reference voltages discussed and illustratively shown herein may be increased or decreased as the exigencies of the circumstances require.

What is claimed is:

1. A broadband repeater system for relaying signals transmitted from a plurality of diverse stations comprising, in combination,
- a broadband amplifier,
- means for applying received signals to said amplifier,
- means for determining the number of independent signals simultaneously present at the input of said amplifier,
- and means responsive to said determining means for selectively adjusting the total power level of said applied signals.

2. A broadband repeater system for relaying signals transmitted from a plurality of diverse stations comprising, in combination,
- a broadband amplifier,
- means for applying received signals to said amplifier,
- means for determining the number of signals simultaneously present at the input of said amplifier,
- and means responsive to said determining means for selectively adjusting the total power level of said applied signals to a predetermined optimum value in accordance with the number of signals determined to be present at the input of said amplifier.

3. A broadband repeater system as defined in claim 2 wherein said broadband amplifier is of the traveling-wave tube type.

4. A broadband repeater system for relaying signals transmitted from a plurality of diverse stations at indeterminate times comprising,
- a broadband amplifier,
- means for applying received signals to said amplifier,
- means for determining the number of signals simultaneously present at the input of said amplifier,
- and means responsive to said determining means for adjusting the operating power level of said amplifier to a predetermined optimum value dependent on the number of signals determined to be present at the input of said amplifier.

5. A broadband repeater system as defined in claim 4 wherein said determining means comprises a plurality of contiguous bandpass filter networks responsive to said received signals for detecting the presence of a signal within the respective frequency band of each network,
- and means responsive to said networks for developing a signal of a magnitude corresponding to the sum of the number of received signals detected.

6. A broadband repeater system for accommodating a plurality of input signals comprising,
- a broadband amplifier,
- means for applying input signals to said broadband amplifier,
- a plurality of contiguous bandpass networks responsive to said input signals for detecting the presence of a signal in the respective frequency band of each network, means responsive to said networks for developing a first signal proportional to the number of input signals detected, means for developing a second signal proportional to the total power level of said input signals, means for developing a signal proportional to the difference of said first signal and said second signal, and means responsive to said difference signal for altering the power level of said input signal.

7. A broadband repeater system for accommodating a plurality of input signals comprising, a broadband amplifier, means for applying input signals to said broadband amplifier, a plurality of contiguous bandpass networks responsive to said input signals for detecting the presence of a signal in the respective frequency band of each network, means responsive to said networks for determining the number of input signals detected, means responsive to said determining means for developing a reference voltage dependent on the number of detected input signals, means for developing a monitoring voltage proportional to the total power level of said applied input signals, means for developing a signal proportional to the difference of said reference voltage and said monitoring voltage, and means responsive to said difference signal for altering the power level of said applied input signals.

8. A broadband repeater system for relaying a plurality of input signals comprising, a broadband amplifier, means for applying input signals to said broadband amplifier, a plurality of networks having contiguous bandpass characteristics responsive to said input signals for developing electrical indications of the presence of a signal within the respective frequency band of each network, a plurality of means, each respectively responsive to one of said networks, for developing an output signal representative of the peak amplitude of each electrical indication developed by said networks, a plurality of means for developing, respectively, a signal of constant magnitude when each of said peak amplitude signals exceeds a predetermined value, summing means responsive to said signals of constant magnitude for determining the number of input signals present, means responsive to said summing means for developing a first signal of a magnitude dependent on the number of input signals determined to be present, means responsive to said applying means for developing a second signal proportional to the power level of said applied input signals, comparison means for developing a signal proportional to the difference of said first signal and said second signal, and attenuating means responsive to said difference signal for altering the power level of said applied input signals.

9. A repeater system comprising in combination, a traveling-wave tube amplifier, a traveling-wave tube amplifier, means for applying input signals to said amplifier, a plurality of filter networks having contiguous bandpass characteristics responsive to said input signals for developing electrical indications of the presence of a signal within the respective frequency band of each network, a plurality of peak rectifier means, each respectively responsive to one of said networks, for developing an output signal representative of the peak amplitude of each electrical indication developed by said networks, a plurality of multivibrator means for developing, respectively, a signal of constant magnitude when each of said peak amplitude signals exceeds a predetermined value, a summing network responsive to said signals of constant magnitude for determining the number of input signals present, means responsive to said summing network for developing a reference voltage of a magnitude dependent on the number of input signals determined to be present, means responsive to said applying means for developing a monitoring voltage proportional to the power level of said applied input signals, comparison means for developing a signal proportional to the difference of said reference voltage and said monitoring voltage, and variable impedance means responsive to said difference signal for altering the power level of said applied input signals.

References Cited

UNITED STATES PATENTS

| | | | |
|---|---|---|---|
| 2,680,162 | 6/1954 | Brehm et al. | 179—170 |
| 2,826,637 | 4/1958 | MacAdam | 179—15 |
| 3,028,489 | 4/1962 | Chasek | 325—5 X |
| 3,283,249 | 11/1966 | Mitchell | 325—3 |

ROBERT L. GRIFFIN, *Primary Examiner.*

B. V. SAFOUREK, *Assistant Examiner.*